J. W. LITTLE.
VEHICLE RUNNING-GEAR.
No. 171,293. Patented Dec. 21, 1875.
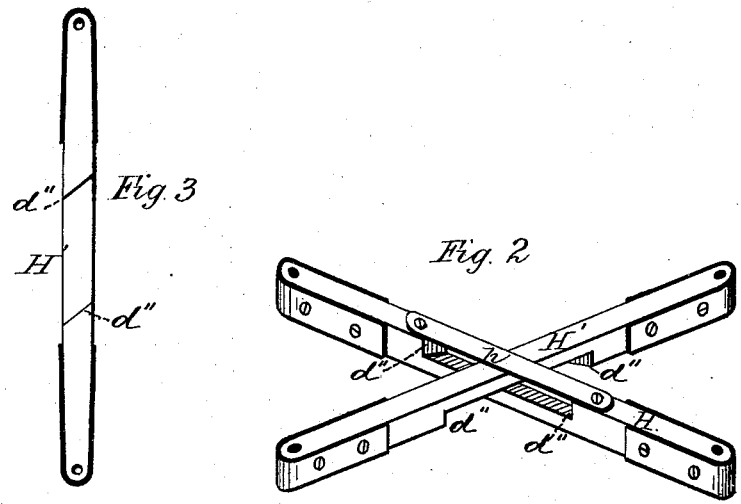
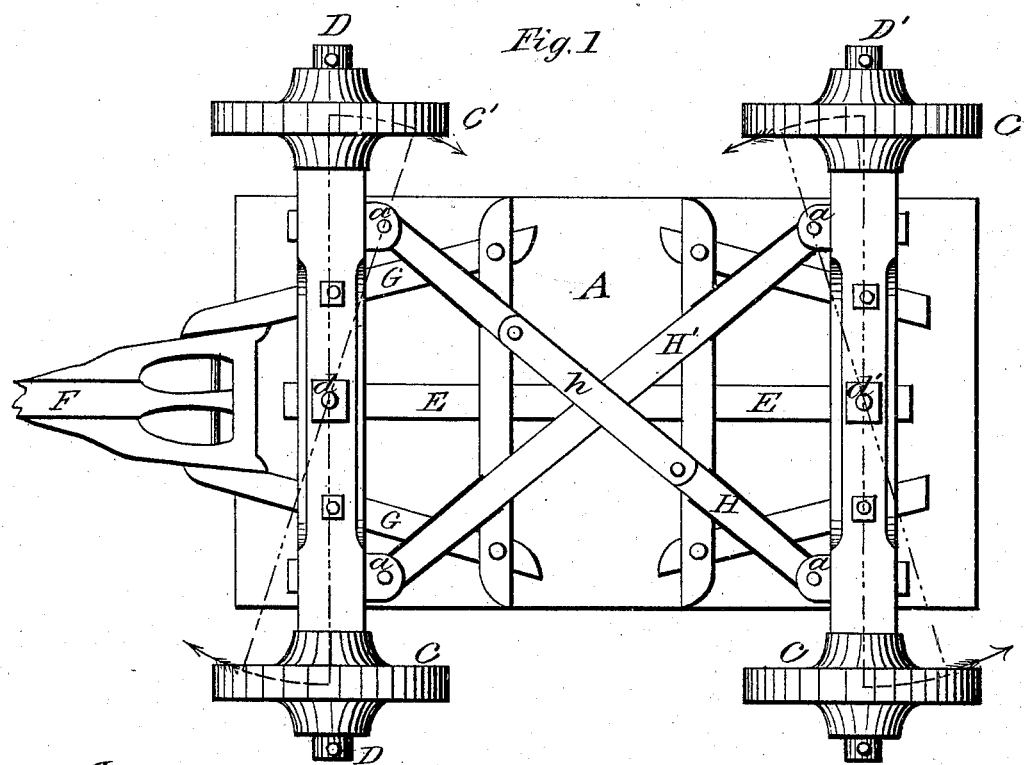

UNITED STATES PATENT OFFICE.

JACOB W. LITTLE, OF OSKALOOSA, IOWA.

IMPROVEMENT IN VEHICLE RUNNING-GEARS.

Specification forming part of Letters Patent No. 171,293, dated December 21, 1875; application filed November 18, 1875.

*To all whom it may concern:*

Be it known that I, JACOB W. LITTLE, of Oskaloosa, in the county of Mahaska and State of Iowa, have invented certain new and useful Improvements in Running-Gear of Vehicles; and I do hereby declare that the following is a full, clear, and exact description thereof, which will enable others skilled in the art to which it appertains to make and use the same, reference being had to the accompanying drawings and to the letters of reference marked thereon, which form a part of this specification, and in which—

Figure 1 is a bottom plan of a wagon having my improvement. Fig. 2 is a perspective view of the cross-reaches detached, and Fig. 3 is a top plan of one of said reaches.

Similar letters of reference indicate corresponding parts in all the figures.

This invention consists in the construction and arrangement of a vehicle-coupling in such a manner as to enable the wheels to track the same in turning, without the possibility of the wheels on the same side touching each other; and it has for its object to facilitate turning, so that a short turn may be made, even where the front wheels are large, without danger of binding said wheels against each other or against the sides or body of the vehicle.

A represents the bed or bottom of a wagon, and C C C' C' are the wheels. The axles D D' are pivoted upon the bolsters by bolts or head-blocks $d\ d'$, which pass through the reach E at each end, as shown. F is the tongue, and G are the hounds, which are of the usual construction.

Affixed near to the ends of each axle is a bearing, $a$, to which the cross-reaches H H', which form the coupling, are pivoted. The middle part of each of these reaches is mortised out, as shown in Fig. 2, the mortise or recess in H being covered by a plate, $h$, so as to form a guide for the middle part of the other reach, H'.

It is obvious that instead of mortising the cross-reaches H and H' these may be left plain, each having bolted onto it a projecting stop or shoulder, made of wood or cast-iron, at the places where the mortises $d''$ commence and end, these stops answering, for all practical purposes, the object of the mortises $d''$. It is also obvious that the center reach E may be left out, that being no part of my invention.

From the foregoing description the operation of my improved vehicle-coupling will be readily understood. When the front axle is turned, in turning the vehicle, the hind axle will, by the operation of the reaches H H', be turned in an opposite direction, as indicated by the dotted lines in Fig. 1, causing the wheels C' C' to approach each other, and the wheels C C on the other side of the vehicle to recede from each other. By this arrangement the hind wheels will run precisely in the track made by the front wheels, and a much shorter turn may be made than where, in turning, the position of the front axle and wheels only is changed. In driving over muddy roads this is an especial advantage, as only two tracks, instead of four, are made in turning.

The front and hind wheels are prevented from touching each other in turning by the raised stops or shoulders $d''$ in the reaches H H', as these will abut against each other, thereby keeping the wheels a suitable distance apart on the side to which the turn is made.

Having thus described my invention, I claim and desire to secure by Letters Patent of the United States—

In the running-gear of vehicles, the cross-reaches H H', having raised stops or shoulders $d''$, substantially as and for the purpose herein shown and described.

In testimony that I claim the foregoing as my own I have hereunto affixed my signature in presence of two witnesses.

JACOB W. LITTLE.

Witnesses:
WILLIS A. REYNOLDS,
MARY J. LITTLE.